2 Sheets—Sheet 1.

J. C. KLEIN.
DIES FOR MAKING GRUBBING-HOES.

No. 186,681. Patented Jan. 30, 1877.

Witnesses:
Inventor:
J. C. Klein
By J. J. Coombs
Attorney

2 Sheets—Sheet 2.

J. C. KLEIN.
DIES FOR MAKING GRUBBING-HOES.

No. 186,681. Patented Jan. 30, 1877.

Witnesses:

Inventor:
J. C. Klein,
By J. J. Coombs,
Attorney.

UNITED STATES PATENT OFFICE.

JOHN C. KLEIN, OF PITTSBURG, PENNSYLVANIA.

IMPROVEMENT IN DIES FOR MAKING GRUBBING-HOES.

Specification forming part of Letters Patent No. 186,681, dated January 30, 1877; application filed May 1, 1876.

*To all whom it may concern:*

Be it known that I, JOHN C. KLEIN, of Pittsburg, in the county of Allegheny and State of Pennsylvania, have invented certain new and useful Improvements in Manufacture of Grubbing-Hoes and Coopers' Frows; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to new and improved dies for forming the eyes of grubbing-hoes and coopers' frows, to be used in oscillating rolls for forming such eyes.

On the 20th day of January, 1874, Letters Patent were granted to me, No. 146,597, for a new method of forming the eyes of picks and mattocks, which Letters Patent were reissued February 29, 1876, said reissue being numbered 6,591, and my present invention relates to improved dies for forming the eyes of grubbing-hoes and frows by a similar process.

As picks and mattocks have shanks or blades extending from both sides of the eye, whereas grubbing-hoes and frows have a blade extending from one side only of the eye, the dies described in my said former patent are not strictly applicable to the forming of eyes in grubbing-hoes or frows.

Figure 1:
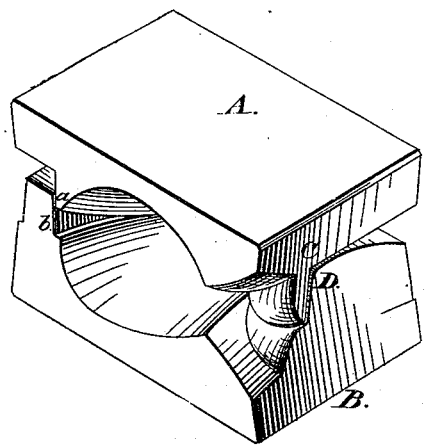
Figure 2:
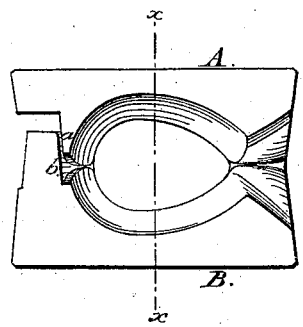
Figure 3:
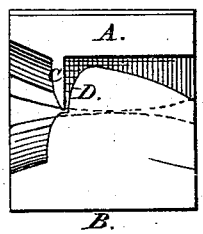
Figure 4:
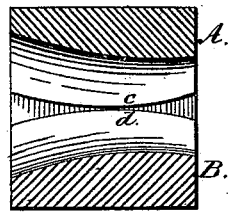
Figure 5:
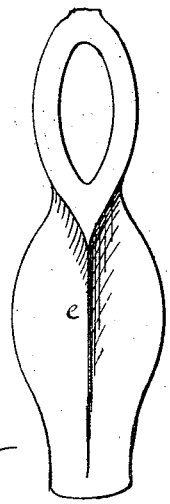
Figure 6:
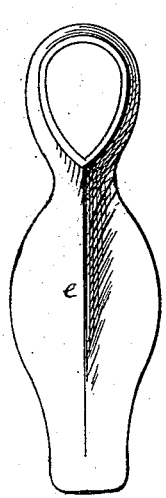
Figure 7:
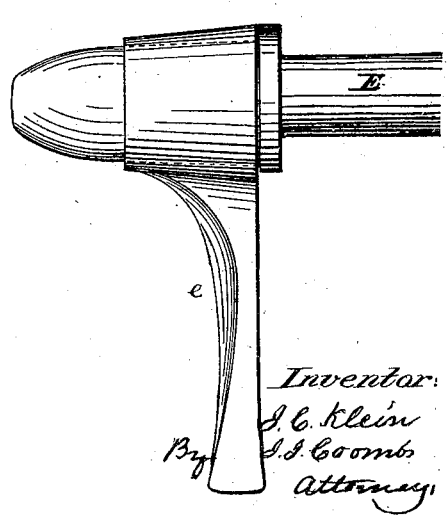
Figure 8:
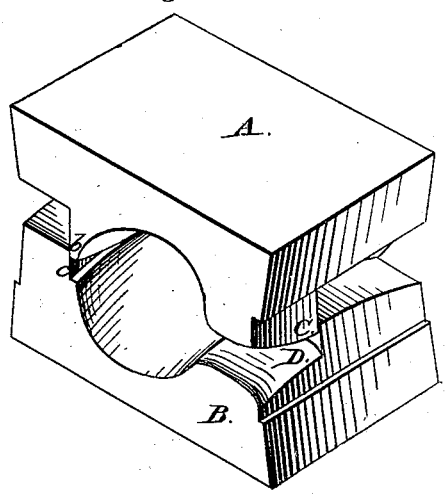
Figure 9:
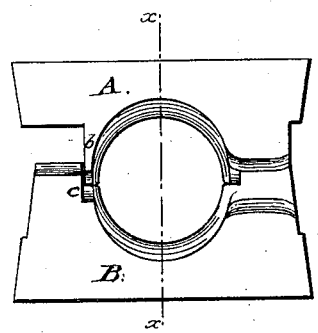
Figure 10:
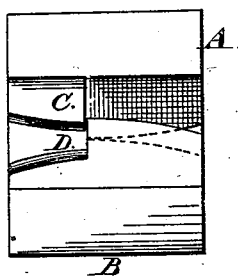
Figure 11:
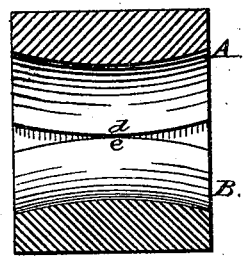
Figure 12:
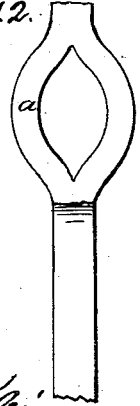
Figure 13:
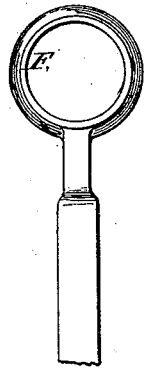
Figure 14:
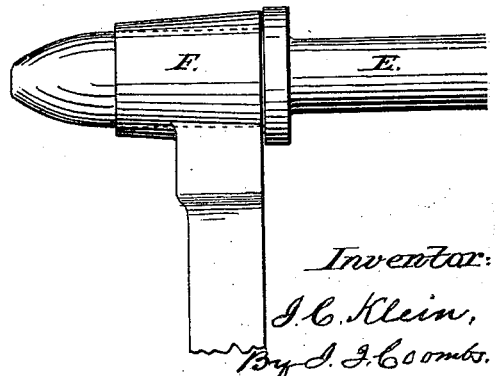

In the accompanying drawings, Figure 1 is a perspective view of a pair of dies for rolling the eyes of grubbing-hoes. Fig. 2 is an end view of the same. Fig. 3 is a side view of the same. Fig. 4 is a cross-section on line $x\,x$, Fig. 2. Fig. 5 is a view of a blank after being punched, and having the metal to form the blade set down by pressure-dies. Fig. 6 is a view of an eye finished by rolling. Fig. 7 is a view of an eye on a mandrel. Fig. 8 is a perspective view of a pair of dies for forming the eyes of frows. Fig. 9 is an end view of the same. Fig. 10 is a side view of the same. Fig. 11 is a cross-section on line $x\,x$, Fig. 9. Fig. 12 is a view of the blank for a frow punched and the metal for the blade set down. Fig. 13 is an eye of a frow finished by rolling. Fig. 14 is a view of a frow-eye on the mandrel.

In the manufacture of grubbing-hoes I first punch the blank in the usual way, preparatory to forming the eye near one end. I then place the blank between two pressure-dies, that will set down the metal to form the blade, leaving the metal to form the eye of the height of the original thickness or width of the blank, and forming a ridge down the center of the blade, as shown at $e$, Figs. 5, 6, and 7. The blank is then reheated to a welding-heat, and forced onto a mandrel, E, Fig. 7, of proper shape to form a completed eye. The blank is then placed on the mandrel, between the dies A B in the oscillating rolls, which roll out the metal so as to form a perfect tubular eye, with solid walls, as shown in Fig. 7. The blade is then flattened out by a hammer, and finished in the usual way.

The upper die A is provided with cheeks $a$, which fit snugly into the recesses $b$ of the lower die B, to form and set up the eye, while the rear end of the die is provided with a projection, C, which fits into the recess D, which set down the edges and form the ridge from the eye to the shank of the blank.

By means of the cheeks $a$ and recesses $b$, the iron around the eye is prevented from being forced sidewise, and forming a feather-edge, and receives a smooth finish. The cheeks are made slightly rounding at their lower sides $c\,d$, as best seen in Fig. 4, so as to allow the dies to freely roll upon each other when operated by the oscillating rolls.

In the manufacture of frows the process is substantially the same as above described, but the dies differ somewhat in form, as is shown by Figs. 8, 9, 10, 11 of the drawings. The cheeks marked $a$ and recesses marked $b$ in the dies for grubbing-hoes, Figs. 1 and 2, are marked $b\,c$ in the dies for frows, Figs. 8 and 9, and the parts marked $c\,d$ in Fig. 4 are marked $d\,e$ in Fig. 11. With these exceptions the same letters indicate corresponding parts in all the figures.

If, in driving the mandrel into the blanks, either for grubbing-hoes or frows, the metal should separate at the end, no injurious result will follow, as it will be completely welded and made solid by the pressure of the rolls.

The eyes are rolled out in a machine for which an application by John C. Klein and Lewis Gerber for Letters Patent, filed July 19, 1875, is now pending in the United States Patent-Office, or by any machine constructed to operate upon similar principles, producing similar results.

What I claim as my invention, and desire to secure by Letters Patent, is—

The dies A B, constructed as described, and adapted to be used in oscillating rolls for drawing down the metal of the eye of a grub-hoe or frow, substantially at set forth.

In testimony that I claim the foregoing as my own I hereby affix my signature in presence of two witnesses.

JOHN CHR. KLEIN.

Witnesses:
 J. ALEX. KNOX,
 WM. H. PARSONS.